J. LANE.

Improvement in Gang-Plows.

No. 132,842. Patented Nov. 5, 1872.

Witnesses:
Chas. Nida.
C. Sedgwick

Inventor:
J. Lane
per Munn & Co.
Attorneys.

UNITED STATES PATENT OFFICE.

JOSEPH LANE, OF EUGENE, INDIANA.

IMPROVEMENT IN GANG-PLOWS.

Specification forming part of Letters Patent No. 132,842, dated November 5, 1872.

*To all whom it may concern:*

Be it known that I, JOSEPH LANE, of Eugene, in the county of Vermillion and State of Indiana, have invented a new and Improved Gang-Plow, of which the following is a specification:

My invention consists in certain improvements in gang-plows in which the plows are adjustably pivoted to the supporting-frame, and connecting-rods are used for connecting the plow-beams with the evener, so that the draft on the evener forces the points in the ground and keeps them in; and one or more of the plows may be kept out of work while the others are at work, or some may be worked deeper than others, and all may be adjusted higher or lower; and in which rolling colters for cutting the sod, and a gage-wheel for regulating the depth of cut and for supporting the weight at the front of the axle so as to take it off of the horses, are used, which said improvements will be hereinafter described.

Figure 1:
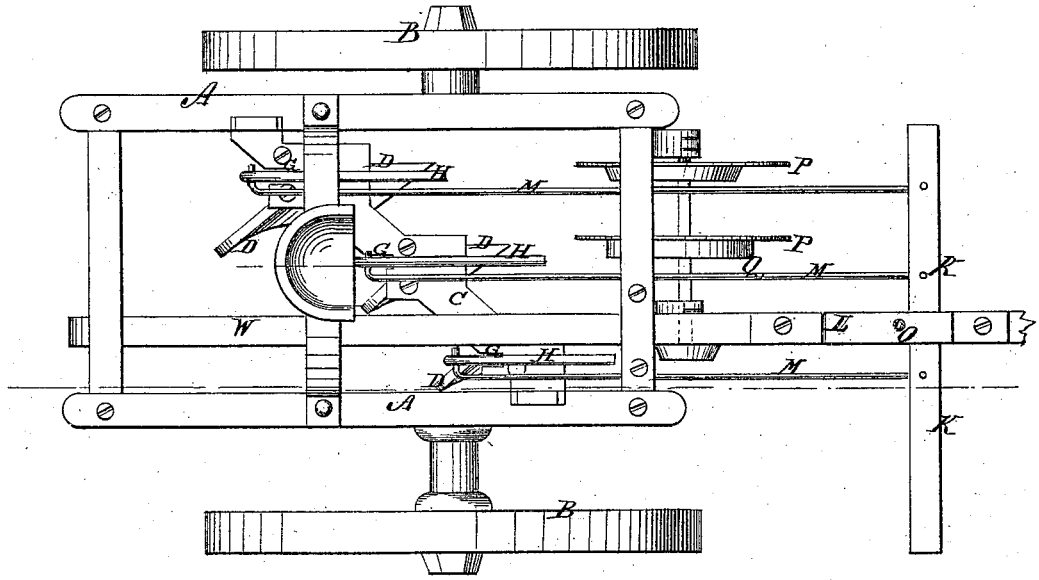
Figure 2:
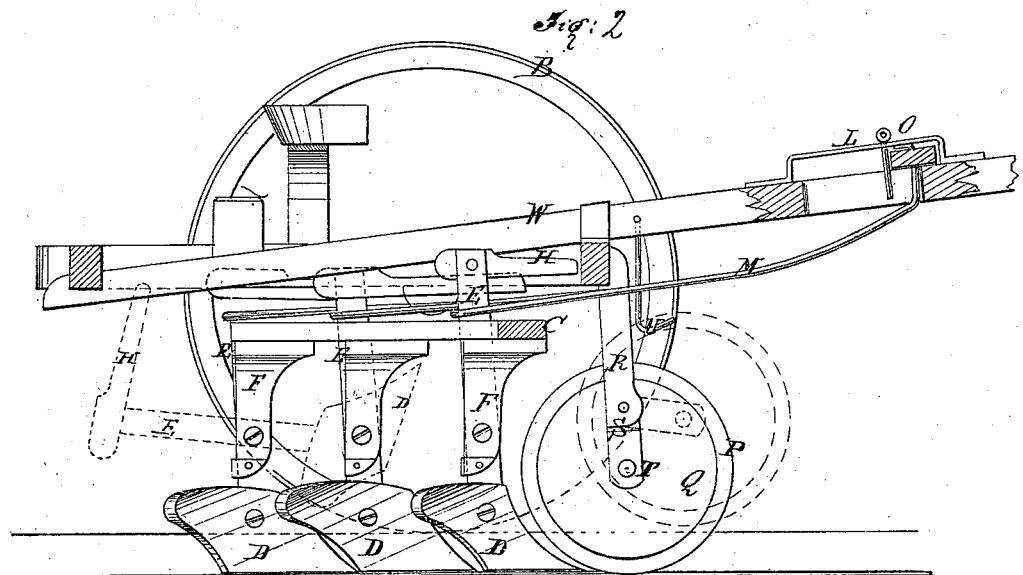

Figure 1 is a plan view of my improved gang plowing-machine, and Fig. 2 is a longitudinal sectional elevation.

Similar letters of reference indicate corresponding parts.

A represents a rectangular frame mounted on truck-wheels B, from which is suspended a beam, C, traversing from side to side diagonally, as shown, for supporting the plows D in the order required by the beams E pivoted to the double hangers F. Said beams extend upward above the diagonal beam and enter notches G for steadying them laterally when the plows are working. Said beams also have a short arm, H, extending forward over the beam C, by which the operator may, when required, force the beams E back and throw the points of the plows out of the ground. This diagonal beam is designed to be made vertically adjustable on the frame by means of toothed bars, pinions, and cranks, or other equivalent devices, and it is to be so that one end can be made higher or lower than the other, as may be required by the nature of the case. It is designed that the beams E shall have two or more holes at different heights connected together by slots in such manner that by forcing said beams backward by levers H and raising or lowering the said beams the plows may be shifted independently of each other for cutting different depths; the object being to adjust them for working in ground having ridges and grooves left by previous cultivation, as often happens. The plows will generally be kept in the ground after having entered by the natural draft; but to enter them in the first place, and as they are from time to time thrown out, the evener K is arranged to slide backward on the tongue under the hasp L, and is provided with a rod, M, for each plow, with a hook at the rear end arranged to hook behind the beams E and draw them forward when the team starts up, so as to turn the points down and cause them to enter the ground. The pin O will then be put in and fasten the evener forward. The rolling colters P and the gage-plate Q are suspended from the vertical bars R by a kind of rule-joint at S, the shoulders of which prevent them from swinging too far back or beyond the line of the said bars, and the gage-wheel Q takes the weight of the tongue off the necks of the horses by rolling on the ground and supporting the tongue by these arms P and the short ones T below the joints. These colter-supports are so jointed to allow of swinging them up out of the way and holding them by a hook, U, when the machine is to be transported from place to place. The tongue W is extended from the front backward the whole length of the frame, and attached at both ends of the latter in such manner as to make a strong and durable connection.

Having thus described my invention, I claim as new and desire to secure by Letters Patent—

1. The bars T connected to the bars R by a rule-joint, S, as described, whereby the wheels Q P may operate to support the tongue and also be suspended by means of the hook V, as set forth.

2. The plows provided with beams E and levers H, and pivoted to the hangers F, as specified.

3. The beam C provided with notches G, and the plow-beams arranged to rest therein, substantially as specified.

4. The combination, with the plows pivoted in the manner described, of the rods M and shifting evener K, substantially as specified.

5. The combination of the notched diagonal beam C, hangers F, plows D, beams E, and levers F, substantially as specified.

JOSEPH LANE.

Witnesses:
  JOHN LANE,
  WILLIAM SHELBY.